United States Patent
Cedergren et al.

(10) Patent No.: US 7,466,658 B2
(45) Date of Patent: Dec. 16, 2008

(54) RECEIVER AND METHOD FOR DECODING OF TRUNCATED DATA

(75) Inventors: Andreas Cedergren, Lund (SE); Christer Ostberg, Staffanstorp (SE); Elias Jonsson, Malmö (SE); Jonas Linde, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 426 days.

(21) Appl. No.: 10/523,987

(22) PCT Filed: Jul. 3, 2003

(86) PCT No.: PCT/EP03/07119
§ 371 (c)(1),
(2), (4) Date: Oct. 21, 2005

(87) PCT Pub. No.: WO2004/019576
PCT Pub. Date: Mar. 4, 2004

(65) Prior Publication Data
US 2006/0103587 A1  May 18, 2006

Related U.S. Application Data

(60) Provisional application No. 60/404,718, filed on Aug. 19, 2002.

(30) Foreign Application Priority Data
Aug. 14, 2002  (EP) .................................. 02388051

(51) Int. Cl.
H04L 27/14  (2006.01)

(52) U.S. Cl. .................. 370/252; 375/249; 375/250

(58) Field of Classification Search .................. 370/342, 370/203, 210, 333, 335, 252; 375/249, 250
See application file for complete search history.

(56) References Cited

U.S. PATENT DOCUMENTS 3,979,555 A  9/1976  Opittek et al.
5,479,447 A  12/1995  Chow et al.

(Continued)

OTHER PUBLICATIONS

Hyunsoo Cheon et al., "Adaptive Multicarrier System with Reduced Feedback Information in Wideband Radio Channels", XP010353406, IEEE, Sep. 19, 1999. pp. 2880-2884.

(Continued)

*Primary Examiner*—Ricky Ngo
*Assistant Examiner*—Ben H Liu
(74) *Attorney, Agent, or Firm*—Michael Cameron

(57) ABSTRACT

Coded digital data symbols sent from a transmitter through a transmission channel of a communications network are received in a receiver. An estimate, represented by a first number of bits, of a sent data symbol is calculated, and a second number of bits, lower than the first number, is selected from the estimate to achieve a rounded estimate represented by the second number of bits. The rounded estimate is decoded to achieve a decoded data symbol. A target value for a block error rate of the transmission channel is received from the network; and the second number of bits is selected in dependence on the target block error rate value. Thus an optimal rounded estimate is provided in most situations, and the method can be performed with the limited computational resources of a terminal.

8 Claims, 6 Drawing Sheets

U.S. PATENT DOCUMENTS

| | | | | |
|---|---|---|---|---|
| 5,621,737 | A | * | 4/1997 | Bucher ........................ 714/704 |
| 5,740,204 | A | * | 4/1998 | Nagashima .................. 375/341 |
| 5,963,599 | A | * | 10/1999 | Curtis et al. ................. 375/341 |
| 5,991,340 | A | * | 11/1999 | Isomura ....................... 375/253 |
| 6,301,315 | B1 | * | 10/2001 | Li ................................ 375/346 |
| 6,556,634 | B1 | * | 4/2003 | Dent ............................ 375/343 |
| 6,807,429 | B2 | * | 10/2004 | Subrahmanya .............. 455/522 |
| 6,842,872 | B2 | * | 1/2005 | Yedida et al. ................ 714/703 |
| 6,968,021 | B1 | * | 11/2005 | White et al. ................. 375/340 |
| 6,980,584 | B1 | * | 12/2005 | Yaguchi ...................... 375/148 |
| 2008/0025264 | A1 | * | 1/2008 | Willenegger et al. ........ 370/333 |

OTHER PUBLICATIONS

Henrik Olson et al., "Differential PSK Detector ASIC Design for Direct Sequence Spread Spectrum Radio", XP010198736, IEEE, Sep. 23, 1996, pp. 97-101.

* cited by examiner

| Target BLER | Scaling Factor |
|---|---|
| $\leq 10^{-3}$ | $2^2$ (Factor I) |
| $> 10^{-3}$ | $2^4$ (Factor II) |

| Target BLER | Scaling Factor |
|---|---|
| ≤10⁻⁴ | $2^2$ (Factor I) |
| 10⁻⁴ - 10⁻³ | $2^3$ (Factor II) |
| >10⁻³ | $2^4$ (Factor III) |

RECEIVER AND METHOD FOR DECODING OF TRUNCATED DATA

This patent application claims the benefit of priority from U.S. Provisional Patent Application Ser. No. 60/404,718 filed on Aug. 19, 2002. This application incorporates by reference the entire disclosure of U.S. Provisional Patent Application Ser. No. 60/404,718.

TECHNICAL FIELD OF THE INVENTION

The invention relates to a method of receiving coded digital data symbols sent from a transmitter through a transmission channel of a communications network, the method comprising the steps of calculating an estimate of a sent data symbol, said estimate being represented by a first number of bits; selecting from said calculated estimate a second number of bits, said second number being lower than said first number, to achieve a rounded estimate being represented by said second number of bits; and decoding the rounded estimate to achieve a decoded data symbol. The invention further relates to a receiver for receiving coded digital data symbols sent from a transmitter through a transmission channel of a communications network.

DESCRIPTION OF RELATED ART

Terminals for use with such communications networks are normally limited in size and computational resources. One result of this limitation is that there is only a limited bit width to represent data values in a terminal. Therefore, it will often be necessary to truncate or round data values before they can be handled in the terminal. In order to utilize the available bit width optimally, data values to be processed may be scaled by multiplying them with a scaling factor before they are truncated.

One example of data needing to be limited in bit width is found in the receiver of the terminal. The received signal is here represented as a digital data value having one limited bit width in two-complement notation in both the real and the imaginary parts. The received signal is then multiplied by the conjugate value of a channel estimate computed in the receiver to obtain an estimate of the sent coded data symbol. The conjugate value of a channel estimate also has a limited bit width in two-complement notation in both the real and the imaginary parts, which may be equal to or different from that of the received signal. When the two values are multiplied the resulting estimate will have a bit width that is equal to the sum of the two other bit widths. However, the bit width available for the processing of this estimate will also be limited and probably smaller than the sum of the two other bit widths.

Therefore, the bit width has to be reduced before the estimate is further processed, and a scaling factor may have to be selected in order to utilize the available bit width optimally. It is known to find a scaling factor by means of an optimisation algorithm that computes one fixed factor intended to be optimal in the current situation. However, since the signal level in the receiver typically changes very rapidly, a fixed factor will not be optimal. Adaptive algorithms that constantly updates the scaling factor based on the input signals are also known. Although these adaptive algorithms may be able to provide optimal scaling factors in most situations, they are quite complex and require considerable computational resources, and as mentioned before such resources are rarely available in the terminals in question here. Although reference is here made to a scaling factor and truncation, the same problem exists for other rounding methods as well.

Therefore, it is an object of the invention to provide a method of the abovementioned type which can provide an optimal rounded estimate in most situations, and which can be performed with the limited computational resources of a terminal of the type described above.

SUMMARY

According to the invention the object is achieved in that the method further comprises the steps of receiving from said network a target value for a block error rate of the transmission channel; and selecting said second number of bits in dependence on said target block error rate value.

Many networks provide information on such a target value, which should be used by the receiver, and by selecting a rounded estimate based on this target value, a simple method, which requires much less complexity than the known adaptive algorithms, is achieved. The estimated coded data symbols, of which the bit width is limited, are used as the input to a channel decoder, and the performance of this decoder changes with the selected rounded estimate, e.g. in the form of a scaling factor. For a given signal-to-interference ratio the obtained block error rate depends on the scaling factor. When the target value for the block error rate is known, it is thus simple to select the scaling factor which is known to provide the best results in the range around this target value.

Although other rounding methods may be used, in one embodiment the step of selecting said second number of bits comprises the steps of multiplying said estimate by a scaling factor; and truncating a number of bits from said multiplied estimate.

In an expedient embodiment the scaling factor has the form $2^n$, where n is an integer. The use of this scaling factor corresponds to shifting the bit values n bits to the left, and a scaling is achieved which requires almost no computational resources.

When the method further comprises the step of selecting said scaling factor from a stored table comprising corresponding values of said target block error rate and said scaling factor, it is just to select from the table the scaling factor corresponding to the received target value.

When said target block error rate value is the target BLER value defined in the technical specifications of 3GPP ($3^{rd}$ Generation Partnership Project), a method which is appropriate in terminals according to these specifications is achieved.

As mentioned, the invention also relates to a receiver for receiving coded digital data symbols sent from a transmitter through a transmission channel of a communications network, the receiver being arranged to calculate an estimate of a sent data symbol, said estimate being represented by a first number of bits; select from said calculated estimate a second number of bits, said second number being lower than said first number, to achieve a rounded estimate being represented by said second number of bits; and decode the rounded estimate to achieve a decoded data symbol. When the receiver is further arranged to receive from said network a target value for a block error rate of the transmission channel; and select said second number of bits in dependence on said target block error rate value, a receiver which can provide an optimal rounded estimate in most situations, and which can calculate the rounded estimate with the limited computational resources of a terminal of the type described above, is achieved.

Although the receiver may use other rounding methods, in one embodiment the receiver is further arranged to select said second number of bits by multiplying said estimate by a scaling factor; and truncating a number of bits from said multiplied estimate.

In an expedient embodiment the scaling factor has the form $2^n$, where n is an integer. The use of this scaling factor corresponds to shifting the bit values n bits to the left, and a scaling is achieved which requires almost no computational resources.

When the receiver comprises a stored table comprising corresponding values of said target block error rate and said scaling factor, from which table said scaling factor can be selected, it is just to select from the table the scaling factor corresponding to the received target value.

When said target block error rate value is the target BLER value defined in the technical specifications of 3GPP ($3^{rd}$ Generation Partnership Project), a receiver which is appropriate in terminals according to these specifications is achieved.

BRIEF DESCRIPTION OF THE DRAWINGS

The invention will now be described more fully below with reference to the drawings, in which.

DETAILED DESCRIPTION OF EMBODIMENTS

Figure 1:
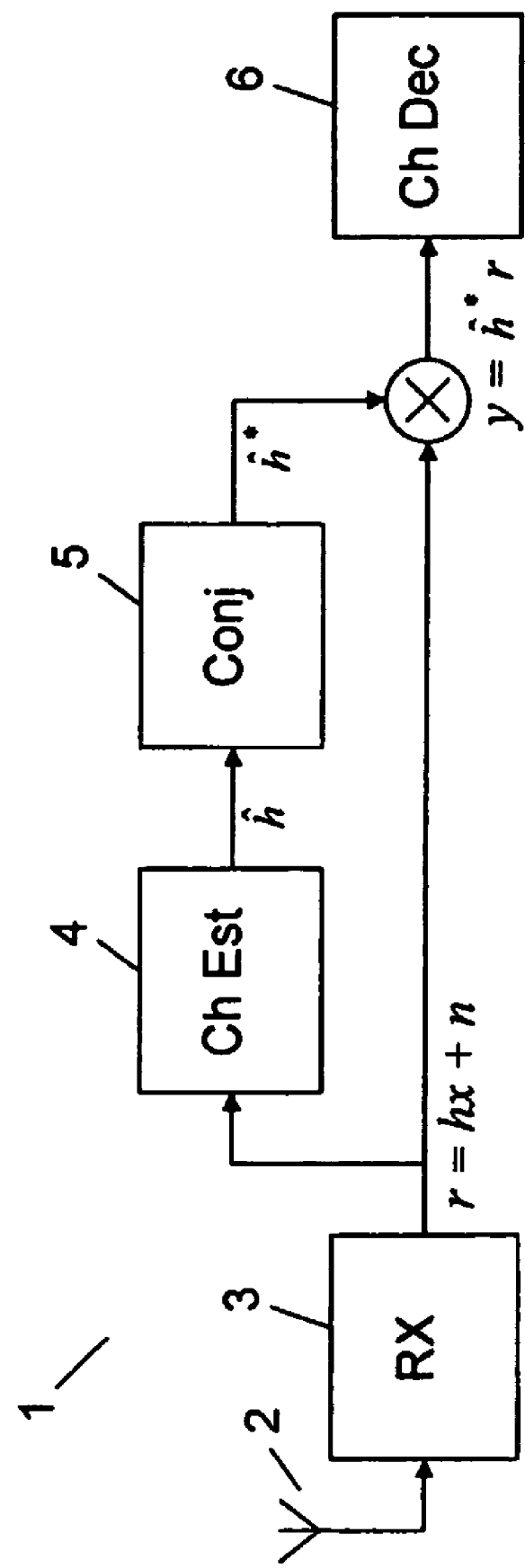
FIG. 1 shows a receiver circuit in which the invention may be used.

FIG. 1 shows an example of a receiver circuit 1 in which the invention can be used. The receiver circuit 1 is here a part of a terminal, e.g. a mobile telephone, for use in a communications system according to the 3GPP UMTS standard ($3^{rd}$ Generation Partnership Project—Universal Mobile Telecommunications System). The receiver circuit could also be located in e.g. a base station corresponding to uplink transmission.

A radio signal representing coded data symbols sent from a corresponding transmitter is received through an antenna 2 and down-converted to a baseband signal in a front-end receiver block 3. This block further includes a number of other functions, such as amplification, automatic gain control, analog-to-digital conversion, despreading and a RAKE combiner, but since these functions are not relevant to the present invention, they are not described in further detail here.

The output signal from the front-end receiver block 3 is a signal r, which can be described as r=hx+n, where h represents the transmission channel, x is the sent coded data symbol, and n represents noise. All parameters are complex values. The signal r is represented as a digital value in the circuit by a number of bits, e.g. a bits, in two-compliment notation in the real as well as the imaginary part.

A channel estimator 4 computes a channel estimate ĥ from the received signal r. This estimate is also represented as a digital value in the circuit by a number of bits, e.g. b bits, in two-compliment notation in the real as well as the imaginary part. The conjugate function 5 calculates the complex conjugate of the channel estimate ĥ, and an estimate y of the sent coded data symbol x is then achieved by multiplying the received signal r by the conjugate of the channel estimate ĥ, i.e. y=ĥ*r.

The estimate y would now be represented as a digital value by a+b bits in two-compliment notation in the real as well as the imaginary part, but typically the computational resources are not sufficient to handle values with so many bits, and therefore some of the bits have to be truncated so that the estimate y is represented by e.g. c bits, where c<a+b, before the estimate is further processed in a channel decoder 6.

Figure 2:
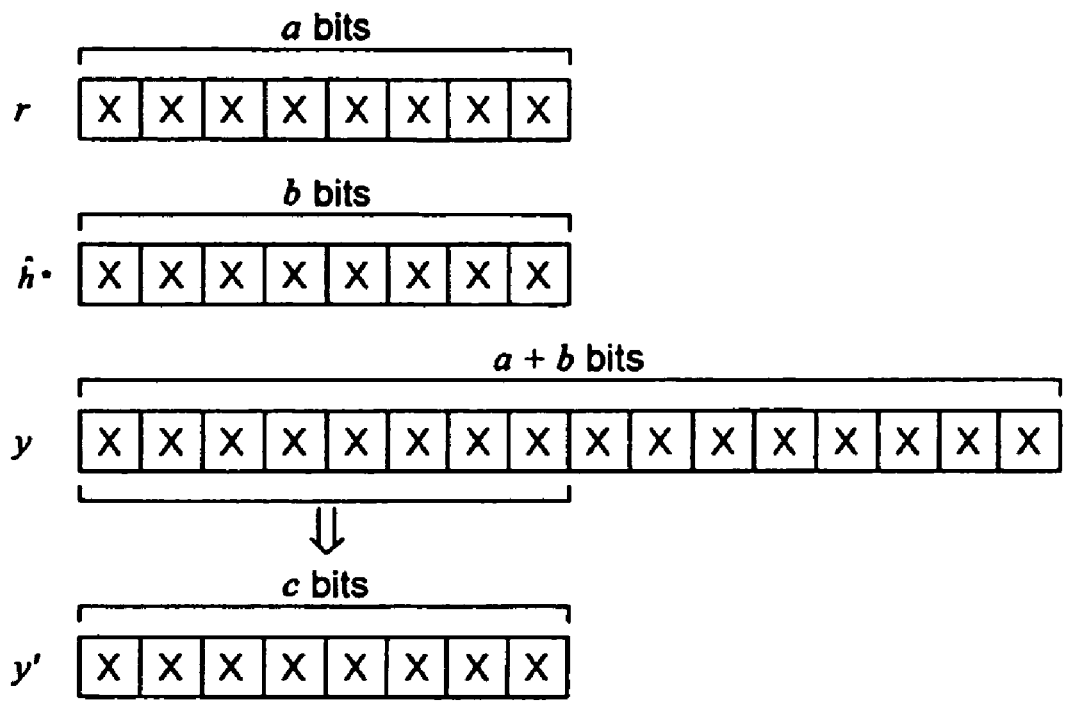
FIG. 2 shows how an estimate having 16 bits may be truncated so that the eight most significant bits remain.

FIG. 2 illustrates an example, where the received signal r and the conjugate ĥ* of the channel estimate ĥ are both represented by eight bits, i.e. a=b=8. The estimate y will then be represented by 16 bits. If, however, only eight bits are available also for the representation of the estimate, the 16-bit estimate y has to be replaced by an 8-bit estimate y', and therefore the other eight bits will have to be truncated. Since all 16 bits may be carrying information, it will be obvious to keep the eight most significant bits and truncate the eight least significant bits, as it is shown in FIG. 2.

Figure 3:
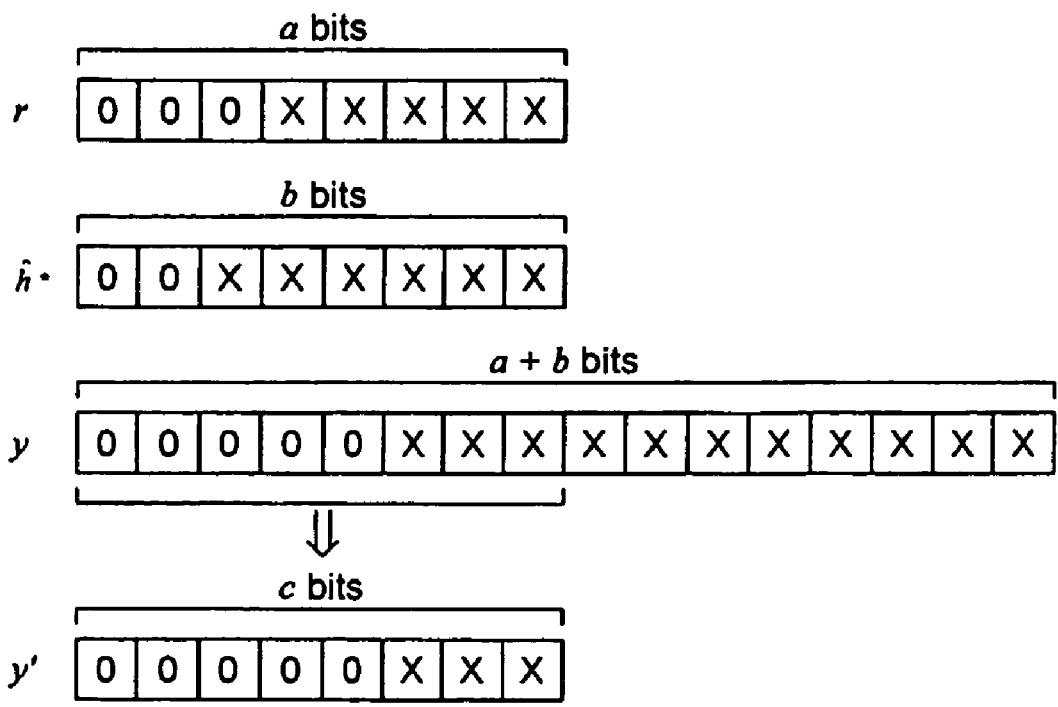
FIG. 3 shows the situation of FIG. 2, when the estimate has a number of leading zeros.

However, by low signal levels the most significant bits of the received signal r may have the value "0", and the same may be the case for the conjugate ĥ*. In FIG. 3 an example is shown, in which the three first bits of r and the two first bits of ĥ* have the value "0". As a result, also the five first bits of the estimate y will have the value "0". If y' is still taken as the eight most significant bits of y, as shown in FIG. 3, much information will be lost, since only three information carrying bits are left in y'.

Figure 4:
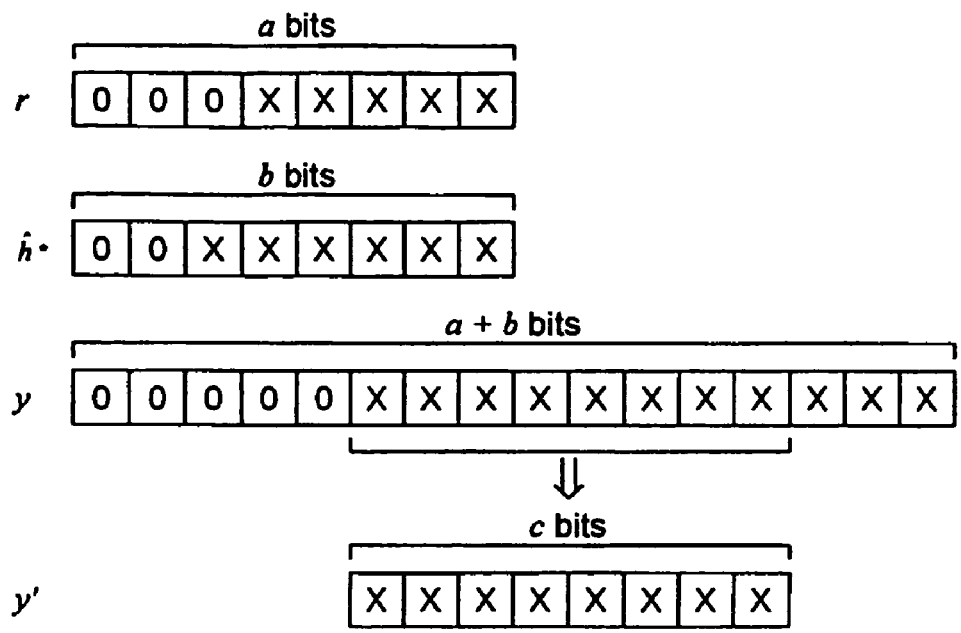
FIG. 4 shows a situation in which the leading zeros are not included in the selected bits.
Figure 5:
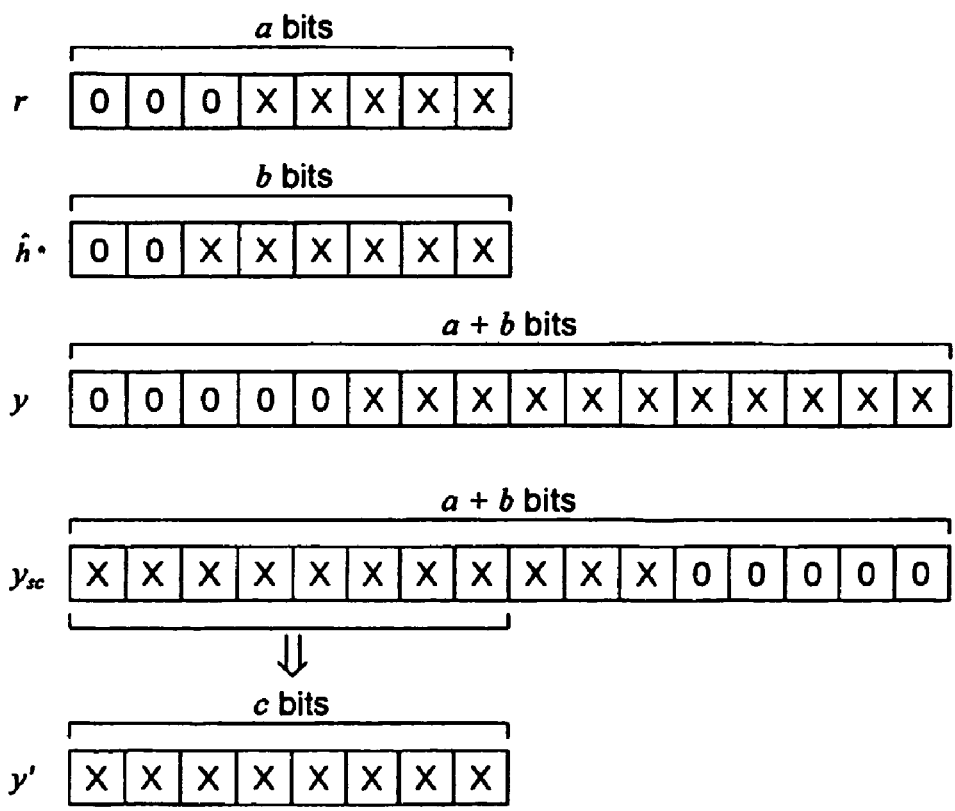
FIG. 5 shows how the estimate may be multiplied by a scaling factor before truncation.
Figure 6:
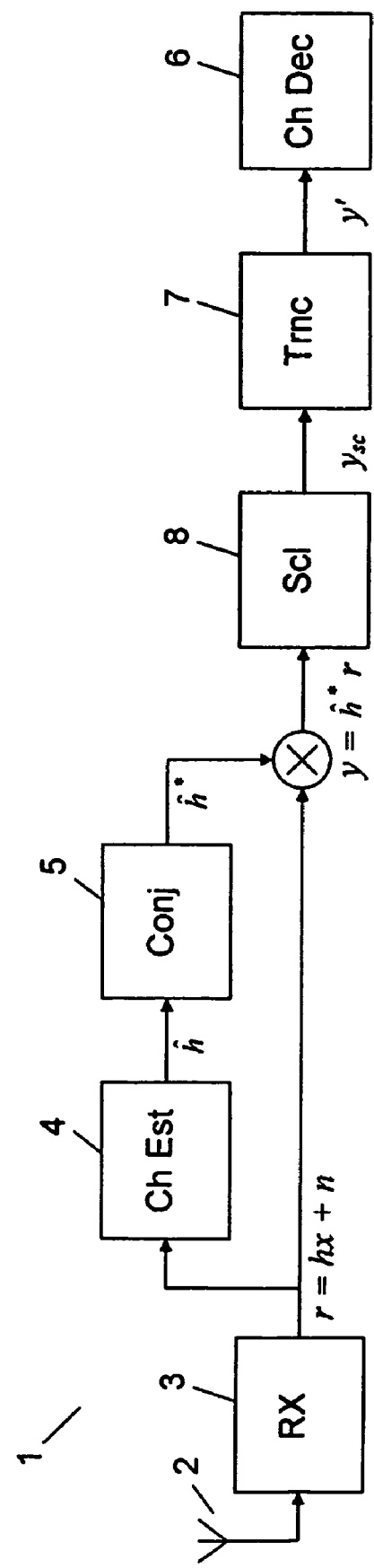
FIG. 6 shows the circuit of FIG. 1 modified with a scaling circuit and a truncation circuit.

Instead, it would be more expedient to leave out the five "0"-bits and select the following eight bits for y', as it is illustrated in FIG. 4. The same result is achieved if the value y with the leading zeros is shifted five bits to the left, which corresponds to multiplying y by a scaling factor $2^5$, and y' is then again taken as the eight most significant bits of the scaled value $y_{sc}$. This is illustrated in FIG. 5, and a corresponding circuit is shown in FIG. 6, in which the signal y is scaled in the scaling circuit 8, and a number of bits are truncated from the scaled value $y_{sc}$ in the truncating circuit 7. An overflow check and a no-overflow check may be applied to the scaled value $y_{sc}$ to ensure that the value is shifted the optimal number of bits to he left.

The present invention relates to the selection of an appropriate scaling factor to be used in the scaling circuit 8. If a fixed factor is used, there will sometimes be overflow, and sometimes there will still be leading zeros. Adaptive algorithms exist which are able to continuously update the scaling factor based on the input to the circuit, but these algorithms typically require more computational power than is available in portable terminals.

Figures 7, 8:
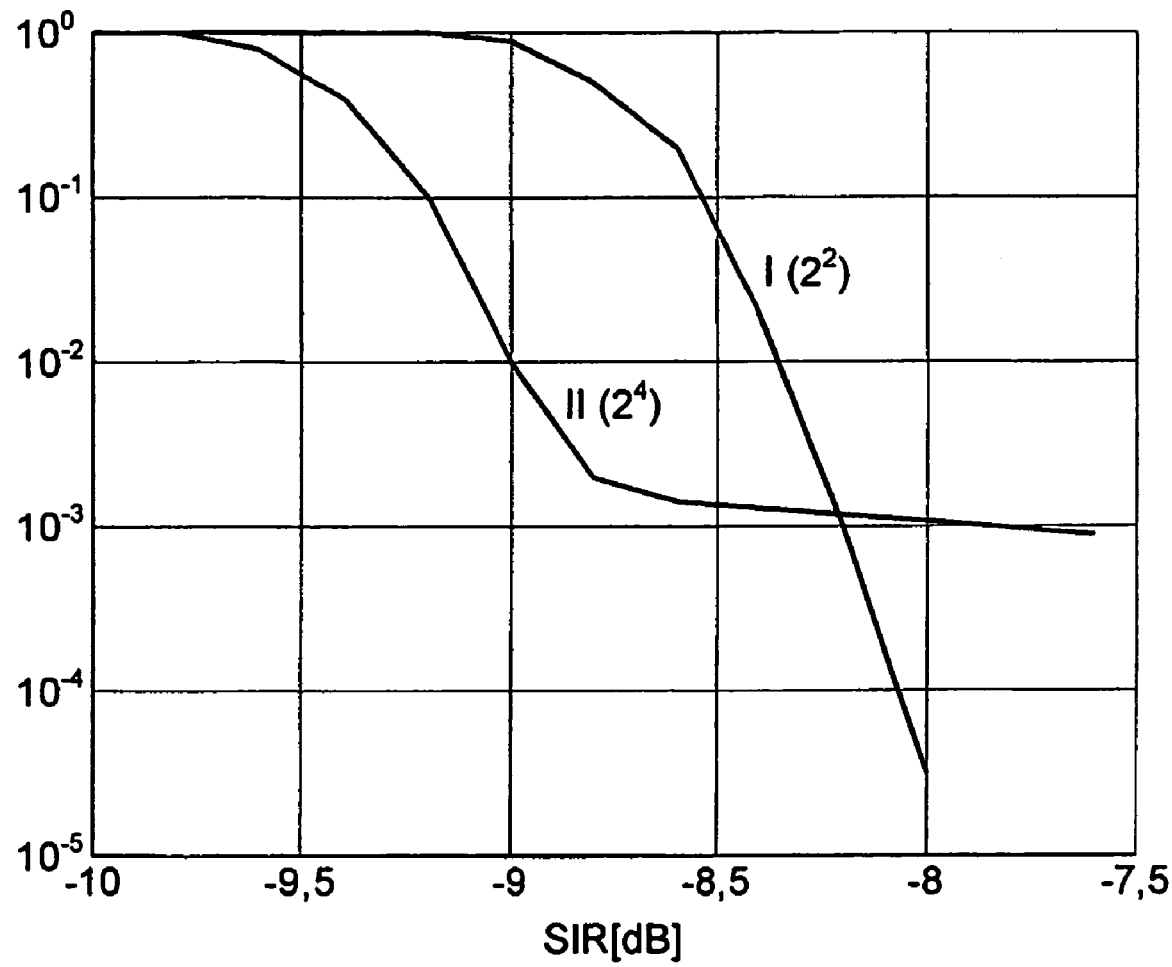
FIG. 7 shows the performance of a decoder measured as an achieved block error rate (BLER) as a function of the signal-to-interference ratio (SIR) of the received radio signal for two different scaling factors.
FIG. 8 shows a table corresponding to FIG. 7 for selection of the scaling factor.

As mentioned, the estimate y', i.e. the estimated coded data symbol, is the input to a channel decoder 6, which as examples could be a turbo decoder or a convolutional decoder. The performance of this decoder will depend on the selected scaling factor in the scaling circuit 8. The performance may be measured as an achieved block error rate (BLER) as a function of the signal-to-interference ratio (SIR) of the received radio signal. FIG. 7 shows an example, where two different scaling factors, factor I and factor II, are used. The signal-to-interference ratio may be changed by changing the signal level of the signal transmitted from the remote end of the transmission link, and thus FIG. 7 shows as an example that if scaling factor I is used in combination with this decoder, a signal-to-interference ratio of −8.3 dB is needed to provide a block error rate of $10^{-2}$. If, however, scaling factor II had been used, a signal-to-interference ratio of −9 dB would have been sufficient to achieve the same block error rate. On the other hand, if a block error rate of $10^{-4}$ is required, scaling factor I is the only usable scaling factor, because with factor II block error rates below approximately $10^{-3}$ cannot be achieved. If, for instance, scaling factor I is $2^2$, corresponding to shifting two bits to the left, and scaling factor II is $2^4$, corresponding to shifting four bits to the left, factor II will result in overflow when the signal level reaches a certain level, and that is the reason that prevents the low block error rates from being achieved with this factor.

In systems according to 3GPP the network actually provides the receiver with a target value for the block error rate (target BLER), and thus according to the invention this target BLER value is used to select the scaling factor of the scaling circuit 8.

In a preferred embodiment a table with corresponding values of target BLER values and scaling factors is used. An example is shown in FIG. 8. It is seen that scaling factor I ($2^2$) is selected for target BLER values $\leq 10^{-3}$, while scaling factor II ($2^4$) is selected for target BLER values $>10^{-3}$.

Figures 9, 10:
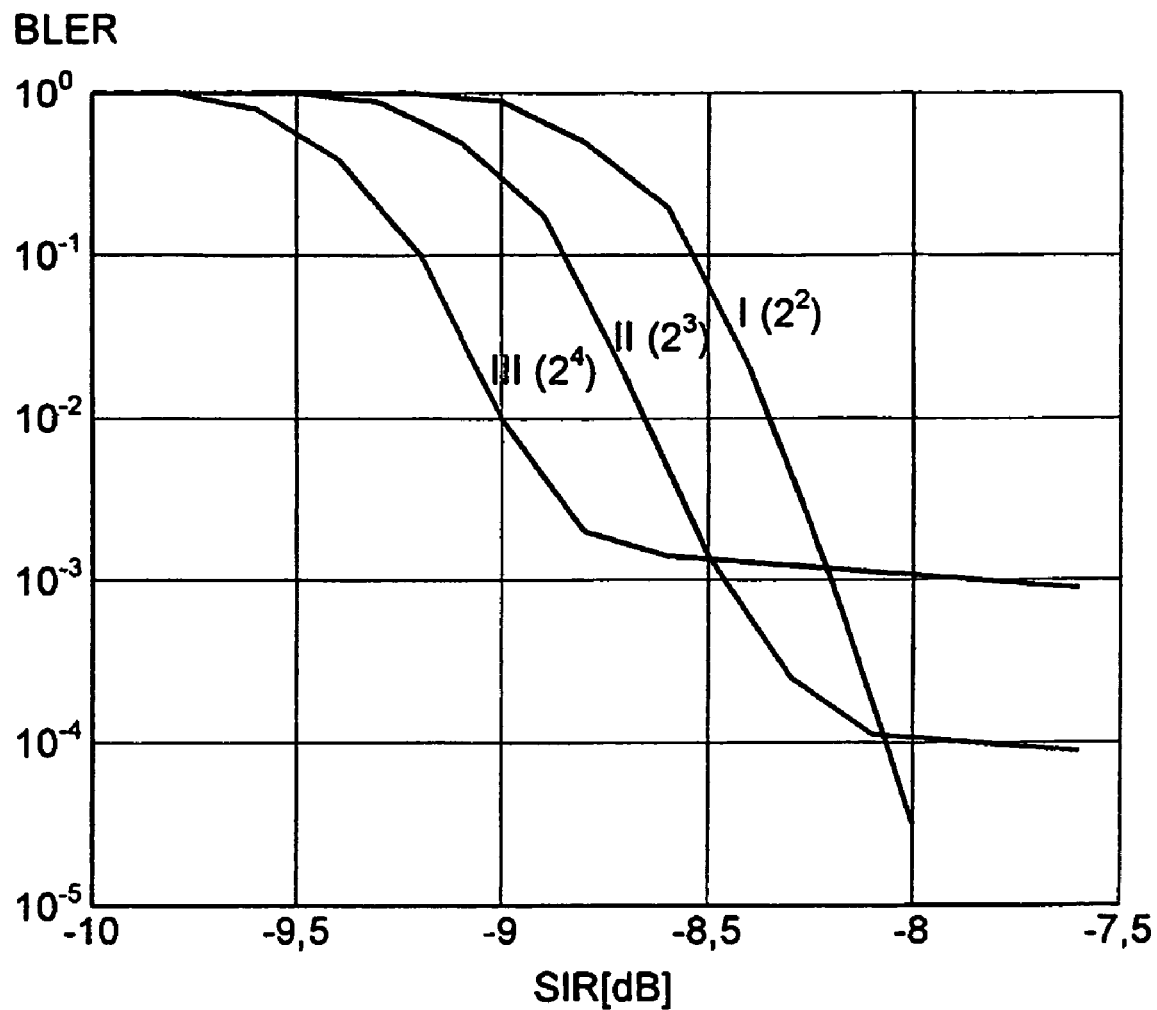
FIG. 9 shows the performance of a decoder measured as an achieved block error rate (BLER) as a function of the signal-to-interference ratio (SIR) of the received radio signal for three different scaling factors.
FIG. 10 shows a table corresponding to FIG. 9 for selection of the scaling factor.

Another example is shown in FIGS. 9 and 10, in which three different scaling factors are used. In this case, scaling factor I ($2^2$) is selected for target BLER values $\leq 10^{-4}$, while scaling factor II ($2^3$) is selected for target BLER values in the range $10^{-4}$-$10^{-3}$, and scaling factor III ($2^4$) is selected for target BLER values $>10^-$.

By using the information about the target BLER value and a look-up table the scaling factor can be optimized for several target BLER values compared to the situation where only one scaling factor is used. The better performance is achieved with the use of only slightly higher amount of computational resources. Thus the suggested solution requires much less complexity than the use of adaptive algorithms, which continuously estimate e.g. the signal-to-interference ratio or the actual block error rate.

In the above description the information about the target BLER value is used for selecting a scaling factor. Instead of using a scaling factor, the relevant bits may also be selected directly as it was illustrated in FIG. 4, and in that case the information about the target BLER value defines the position of the selected bits. Further, truncation is just one of several possible rounding methods, and of course the idea of the invention can be used with other rounding methods as well.

Although a preferred embodiment of the present invention has been described and shown, the invention is not restricted to it, but may also be embodied in other ways within the scope of the subject-matter defined in the following claims.

The invention claimed is:

1. A method of receiving coded digital data symbols sent from a transmitter through a transmission channel of a communications network, the method comprising the steps of:
   calculating an estimate of a sent data symbol, said estimate being represented by a first number of bits;
   selecting from said calculated estimate, a second number of bits, said second number being lower than said first number, to achieve a rounded estimate being represented by said second number of bits;
   decoding the rounded estimate to achieve a decoded data symbol;
   receiving from said network a target value for a block error rate of the transmission channel; and
   selecting said second number of bits in dependence on said target block error rate value, wherein the step of selecting said second number of bits comprises the step of multiplying said estimate by a scaling factor; and truncating a number of bits from said multiplied estimate.

2. A method according to claim 1 wherein said scaling factor has the form $2^n$, where n is an integer.

3. A method according to claim 1, wherein the method further comprises the step of selecting said scaling factor from a stored table comprising corresponding values of said target block error rate and said scaling factor.

4. A method according to claim 1, wherein said target block error rate value is the target BLER value defined in the technical specifications of 3GPP ($3_{rd}$ Generation Partnership Project).

5. A receiver for receiving coded digital data symbols sent from a transmitter through a transmission channel of a communications network, the receiver being arranged to:
   calculate an estimate of a sent data symbol, said estimate being represented by a first number of bits;
   select from said calculated estimate a second number of bits, said second number being lower than said first number, to achieve a rounded estimate being represented by said second number of bits; and
   decode the rounded estimate to achieve a decoded data symbol, wherein the receiver is further arranged to:
      receive from said network a target value for a block error rate of the transmission channel; and
      select said second number of bits in dependence on said target block error rate value wherein the receiver is further arranged to select said second number of bits by:
   multiplying said estimate by a scaling factor; and
   truncating a number of bits from said multiplied estimate.

6. A receiver according to claim 5 wherein said scaling factor has the form $2^n$, where n is an integer.

7. A receiver according to claim 5 wherein the receiver comprises a stored table comprising corresponding values of said target block error rate and said scaling factor, from which table said scaling factor can be selected.

8. A receiver according to claim 5, wherein said target block error rate value is the target BLER value defined in the technical specifications of 3GPP ($3_{rd}$ Generation Partnership Project).

* * * * *

UNITED STATES PATENT AND TRADEMARK OFFICE
CERTIFICATE OF CORRECTION

PATENT NO. : 7,466,658 B2
APPLICATION NO. : 10/523987
DATED : December 16, 2008
INVENTOR(S) : Cedergren et al.

Page 1 of 1

It is certified that error appears in the above-identified patent and that said Letters Patent is hereby corrected as shown below:

In Fig. 7, Sheet 5 of 6, delete "-9,5" and insert -- -9.5 --, therefor.

In Fig. 7, Sheet 5 of 6, delete "-8,5" and insert -- -8.5 --, therefor.

In Fig. 7, Sheet 5 of 6, delete "-7,5" and insert -- -7.5 --, therefor.

In Fig. 9, Sheet 6 of 6, delete "-9,5" and insert -- -9.5 --, therefor.

In Fig. 9, Sheet 6 of 6, delete "-8,5" and insert -- -8.5 --, therefor.

In Fig. 9, Sheet 6 of 6, delete "-7,5" and insert -- -7.5 --, therefor.

In Column 4, Line 55, delete "he" and insert -- the --, therefor.

In Column 5, Line 38, delete ">10⁻." and insert -- >$10^{-3}$. --, therefor.

In Column 6, Line 28, in Claim 4, delete "($3_{rd}$" and insert -- ($3^{rd}$ --, therefor.

In Column 6, Line 57, in Claim 8, delete "($3_{rd}$" and insert -- ($3^{rd}$ --, therefor.

Signed and Sealed this

Twenty-sixth Day of May, 2009

JOHN DOLL
*Acting Director of the United States Patent and Trademark Office*